United States Patent [19]

Kuan

[11] Patent Number: 6,030,586

[45] Date of Patent: Feb. 29, 2000

[54] OZONE GENERATING AND OZONE/WATER MIXING APPARATUS

[76] Inventor: Yu-Hung Kuan, 5F-23, 70, Fu-Shing Road, Taoyuan, Taiwan

[21] Appl. No.: 09/182,790

[22] Filed: Oct. 30, 1998

[51] Int. Cl.[7] .................................................. B01J 19/08
[52] U.S. Cl. ............................ 422/186.07; 4/222; 4/223; 4/224; 4/228.1; 204/230.8; 422/186.08; 422/186.09
[58] Field of Search ............................. 204/230.8, 230.5, 204/230.2, 278; 422/186.03–186.14

[56] References Cited

U.S. PATENT DOCUMENTS

| | | | |
|---|---|---|---|
| 5,250,177 | 10/1993 | Cho | 210/192 |
| 5,698,091 | 12/1997 | Kuennen | 210/87 |
| 5,824,274 | 10/1998 | Long | 422/186.07 |

*Primary Examiner*—Kathryn Gorgos
*Assistant Examiner*—J. Maisano

[57] ABSTRACT

An ozone generating and ozone/water mixing apparatus includes an ozonizer controlled to convert oxygen into ozone, and an ozone/water mixer connected to the spout of a water tap and an ozone outlet of the ozonizer to receive ozone from the ozonizer and water from the water tap and to let intake water to be mixed with intake ozone, wherein the ozonizer includes a control circuit, an ozone generating unit controlled by the control circuit board to convert oxygen into ozone, a power supply circuit, which provides the necessary working power supply to the control circuit board and the ozone generating unit, a power switch, which transmits power supply from the power supply circuit to the control circuit board and the ozone generating unit, and a negative pressure inductor which is induced by a negative pressure to switch on the power switch when the water tap is opened.

3 Claims, 9 Drawing Sheets

OZONE GENERATING AND OZONE/WATER MIXING APPARATUS

BACKGROUND OF THE INVENTION

The present invention relates to an ozone generating and ozone/water mixing apparatus which comprises an ozonizer controlled by a negative pressure inductor to convert oxygen into ozone, and an ozone/water mixer which mixes ozone from the ozonizer with water from a water tap.

A variety of ozonizer have been developed for generating ozone for cleaning the air, or for mixing with water for cleaning vegetables, fruits, clothes, etc. When ozone is used with water for cleaning foods or articles, it must be well dissolved in water. If ozone is not well dissolved in water, it escapes into the air, causing a big loss. Further, it is harmful to the health if the air contains a high percentage of ozone.

SUMMARY OF THE INVENTION

The present invention has been accomplished under the circumstances in view. According to one aspect of the present invention, the ozone generating and ozone/water mixing apparatus comprises an ozonizer controlled by a negative pressure inductor to convert oxygen into ozone, and an ozone/water mixer which mixes ozone from the ozonizer with water from a water tap. When ozone/water mixer causes a negative pressure to be produced in inducing the negative pressure inductor when the water tap to which the ozone/water mixer is connected is opened. According to another aspect of the present invention, a nozzle and a nozzle adapter are matched inside the ozone/water mixer to increase the flowing speed of water and, to let intake ozone be well mixed with intake water. According to still another aspect of the present invention, a flow guide barrel and a water outlet fitting are provided inside the ozone/water mixer to guide ozone/water mixture into a spiral motion, enabling ozone to be fully dissolved in water.

DETAILED DESCRIPTION OF THE PREFERRED EMBODIMENT

Figure 1:
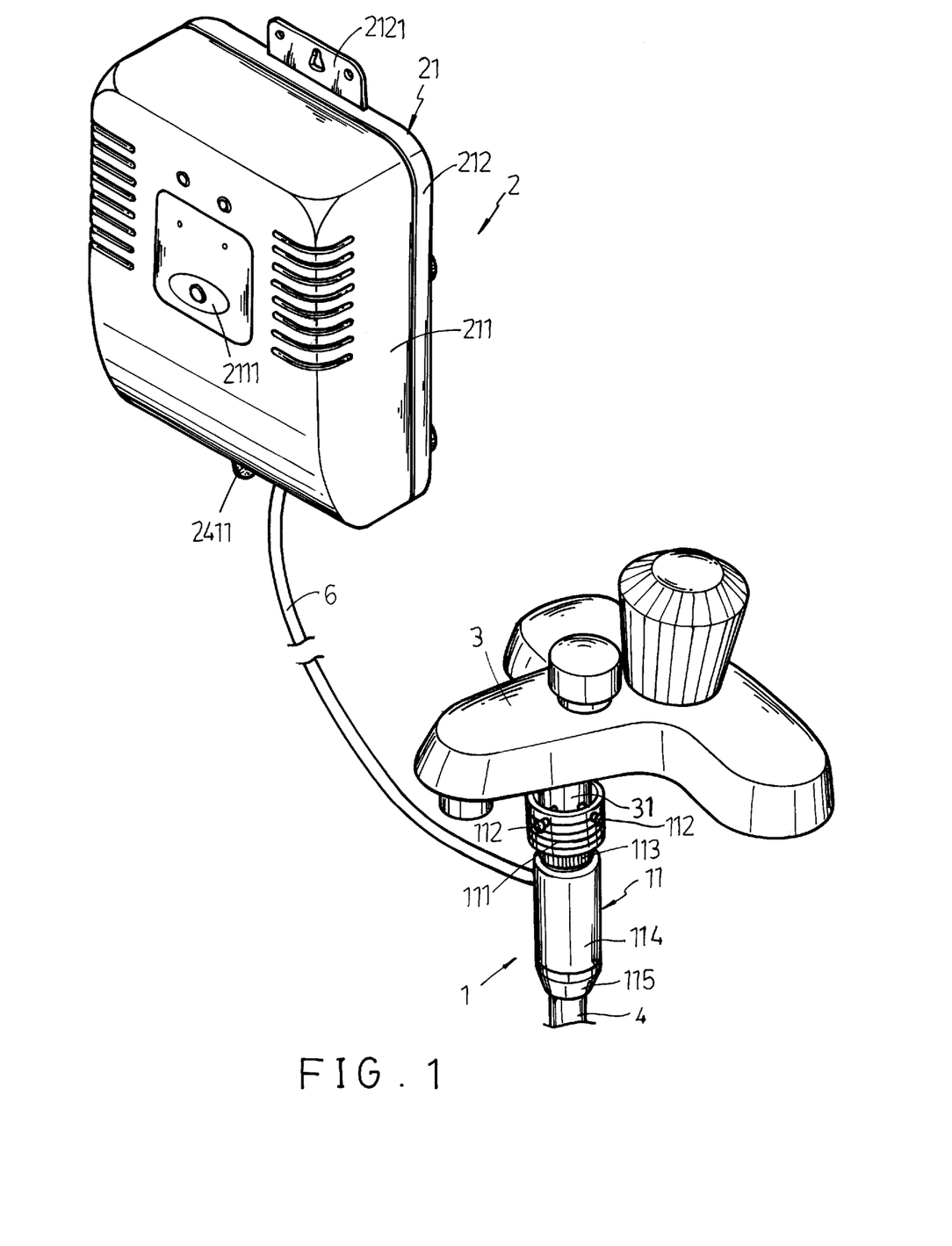
FIG. 1 is a perspective view of the present invention, showing the ozone generating and ozone/water mixing apparatus connected to a water tap.
Figure 2:
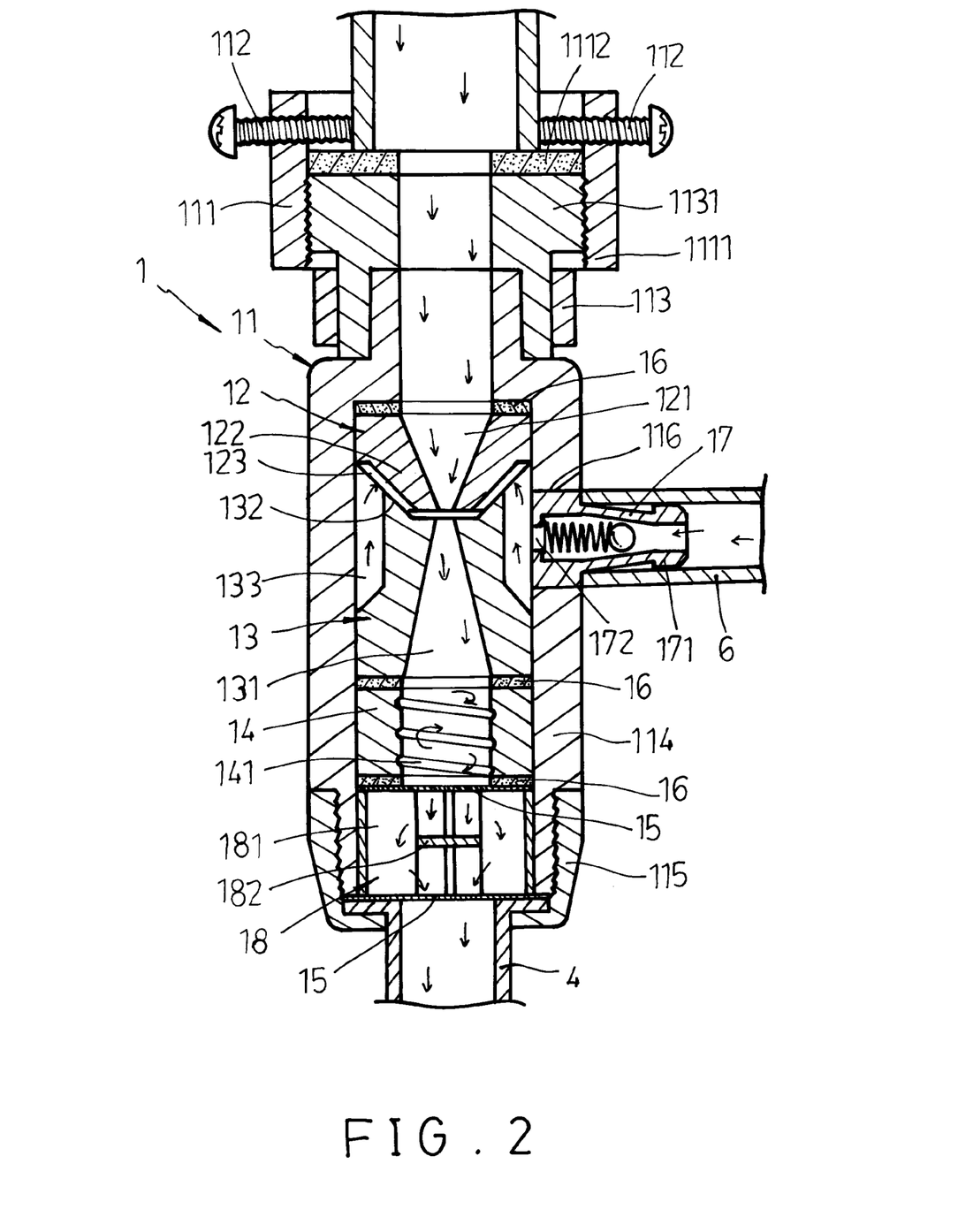
FIG. 2 is a sectional view of a part of the present invention, showing the operation of the ozone/water mixer.
Figure 3:
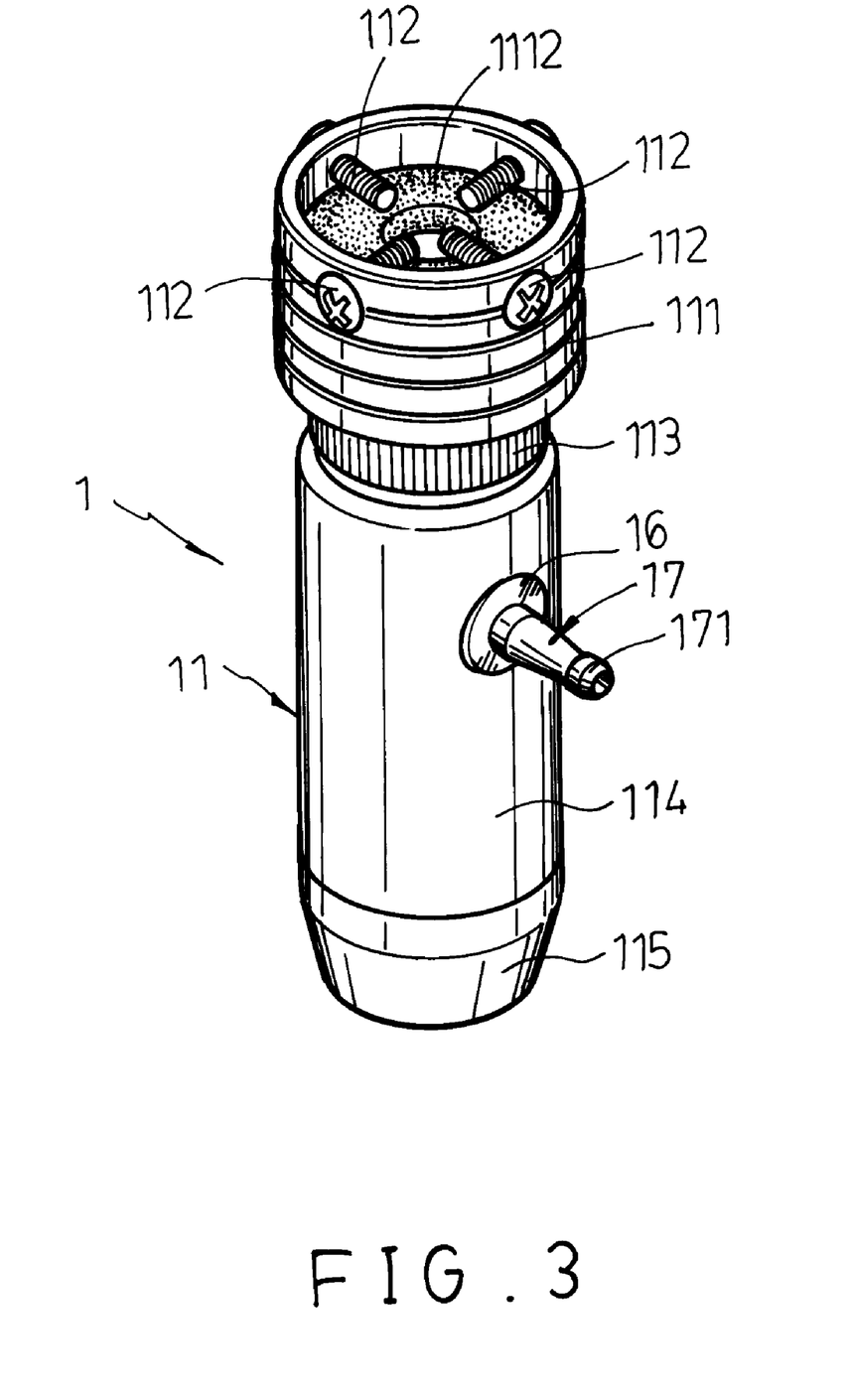
FIG. 3 is a perspective view of an ozone/water mixer for the ozone generating and ozone/water mixing apparatus according to the present invention.
Figure 4:
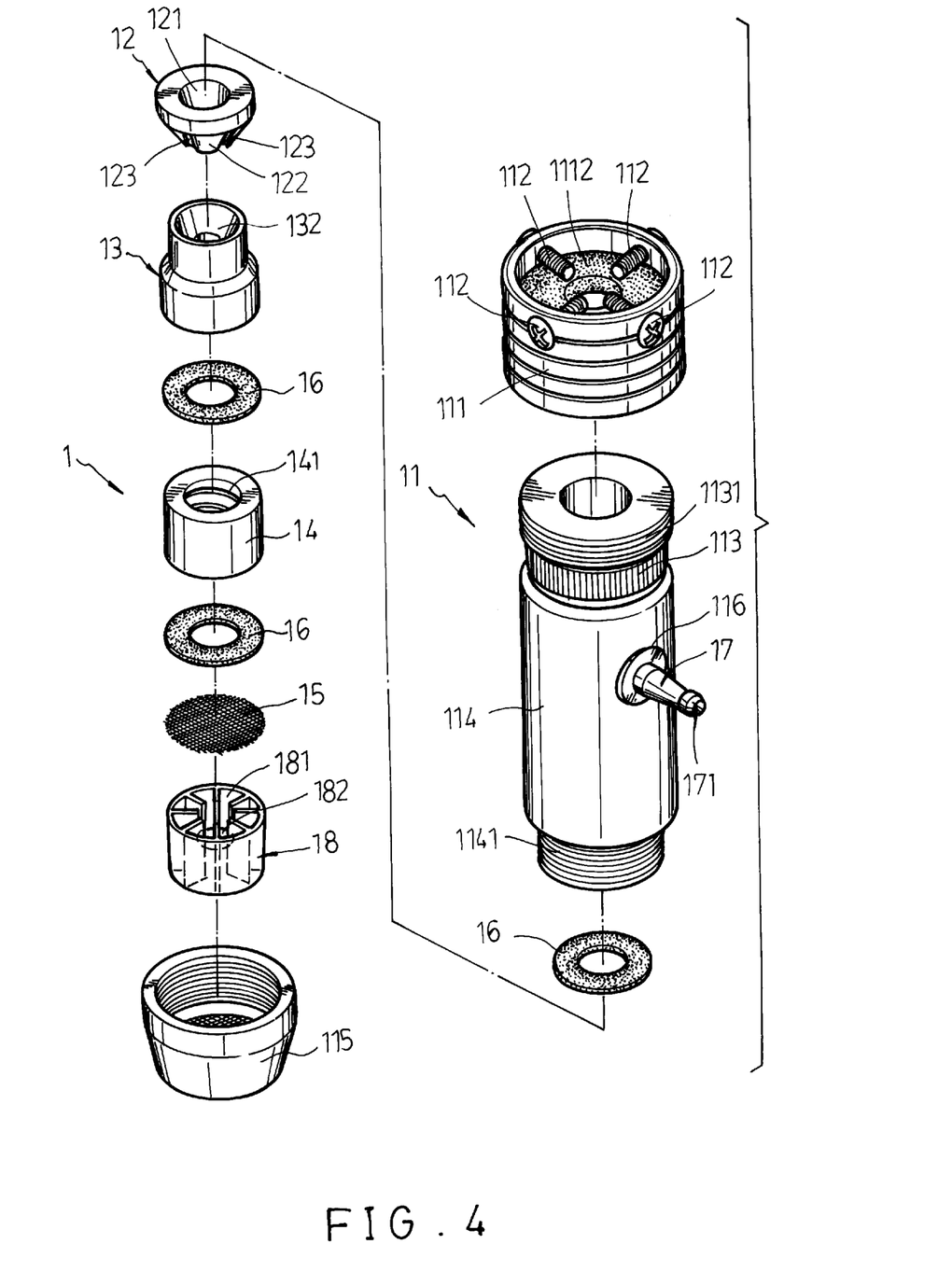
FIG. 4 is an exploded view of the ozone/water mixer shown in FIG. 3.

Referring to FIGS. 1 and 2, an ozone generating and ozone/liquid mixing apparatus in accordance with the present invention is generally comprised of an ozonizer 2, and an ozone/water mixer 1. The ozone/water mixer 1 has a cylindrical shape, a top end connected to one water outlet 31 of a water tap 3, a bottom end connected to a water pipe 4, and a flank connected to the ozone output end of the ozonizer 2 through a guide tube 6.

Referring to FIGS. from 3 through 5 and FIGS. 1 and 2 again, the ozone/water mixer 1 is comprised of a body 11, a nozzle 12, a nozzle adapter 13 a flow guide barrel 14, a wire gauze filter 15, a one-way valve 17, and a water outlet fitting 18. The body 11 is comprised of a cylindrical casing 114 having a threaded bottom coupling portion 1141, a bottom screw cap 115 threaded onto the threaded bottom coupling portion 1141 of the cylindrical casing 114 to secure the cylindrical casing 114 to the water pipe 4, a lock ring 113, a threaded coupling member 1131 fastened to the top end of the cylindrical casing 114 by the lock ring 113, an internally threaded mounting socket 111 threaded onto the threaded coupling member 1131 to secure the body 11 to the water outlet 31 of the water tap 3, and a gasket ring 1112 mounted inside the mounting socket 111 and stopped between the threaded coupling member 1131 and the bottom edge of the water outlet 31 of the water tap 3. The mounting socket 111 is secured to the water outlet 31 of the water tap 3 by holding down screws 112. The nozzle 12, the nozzle adapter 13, the flow guide barrel 14, the wire gauze filter 15 and the water outlet fitting 18 are respectively mounted inside the cylindrical casing 114, and secured in place by the bottom screw cap 115. The casing 111 has an ozone inlet 116 at the periphery. The one-way valve 17 is mounted in the ozone inlet 116, having a connector 171 at an outer end, which is connected to the guide tube 6. The nozzle 12 comprises a conical nozzle body 122, a tapered center through hole 121 disposed in communication with the mounting socket 111 for receiving water from the water tap 3 through the mounting socket 111, and a plurality of radial ozone guide grooves 123 equiangularly spaced around the outside wall of the nozzle body 122. The nozzle adapter 13 is shaped like a stepped cylinder having a tapered top open chamber 132, which receives the conical nozzle body 122 of the nozzle 12, a tapered center hole 131 axially downwardly extended from the tapered top open chamber 132. The diameter of the tapered center hole 131 gradually downwardly increases from the tapered top open chamber 132. When the nozzle adapter 13 is installed in the cylindrical casing 114, an annular ozone accumulation chamber 133 is defined within the cylindrical casing 114 around the upper half of the nozzle adapter 13 in communication between the ozone passage 172 of the one-way valve 17 and the radial ozone guide grooves 123 of the nozzle 12 in the tapered top open chamber 132 of the nozzle adapter 13, therefore ozone is allowed to pass from the ozonizer 2 through the guide tube 6, the one-way valve 17, the annular ozone accumulation chamber 133 and the radial ozone guide grooves 123 into the tapered center hole 131 for mixing with water coming from the nozzle 12. The flow guide barrel 14 is mounted inside the cylindrical casing 114 and retained between the nozzle adapter 13 and the water outlet fitting 18, having a spiral guide groove 141 around its inside wall for guiding ozone contained water into a spiral flow rotatably flowing toward the water outlet fitting 18, enabling ozone and water to be fully mixed. The wire gauze filter 15 is mounted inside the cylindrical casing 114, and retained between the flow guide barrel 14 and the water outlet fitting 18. When ozone contained water flows through the wire gauze filter 15, it is cut by the meshed structure of the wire gauze filter 15, causing fine air bubbles to be produced, and therefore ozone and water are fully mixed into ozone-water mixture. The water outlet fitting 18 comprises a plurality of axial baffles 182 equiangularly spaced around the inside wall thereof, defining a plurality of axially extended diffusion troughs 181. The ozone-water mixture which passes through the wire gauze filter 15 is then guided through the diffusion troughs 181 out of the bottom screw cap 115 into the water pipe 4. Furthermore, rubber seal rings 16 are mounted in the cylindrical casing 114 of the body 11 of the ozone/water mixer 1 between parts thereof to prevent a leakage of water.

Figure 5:
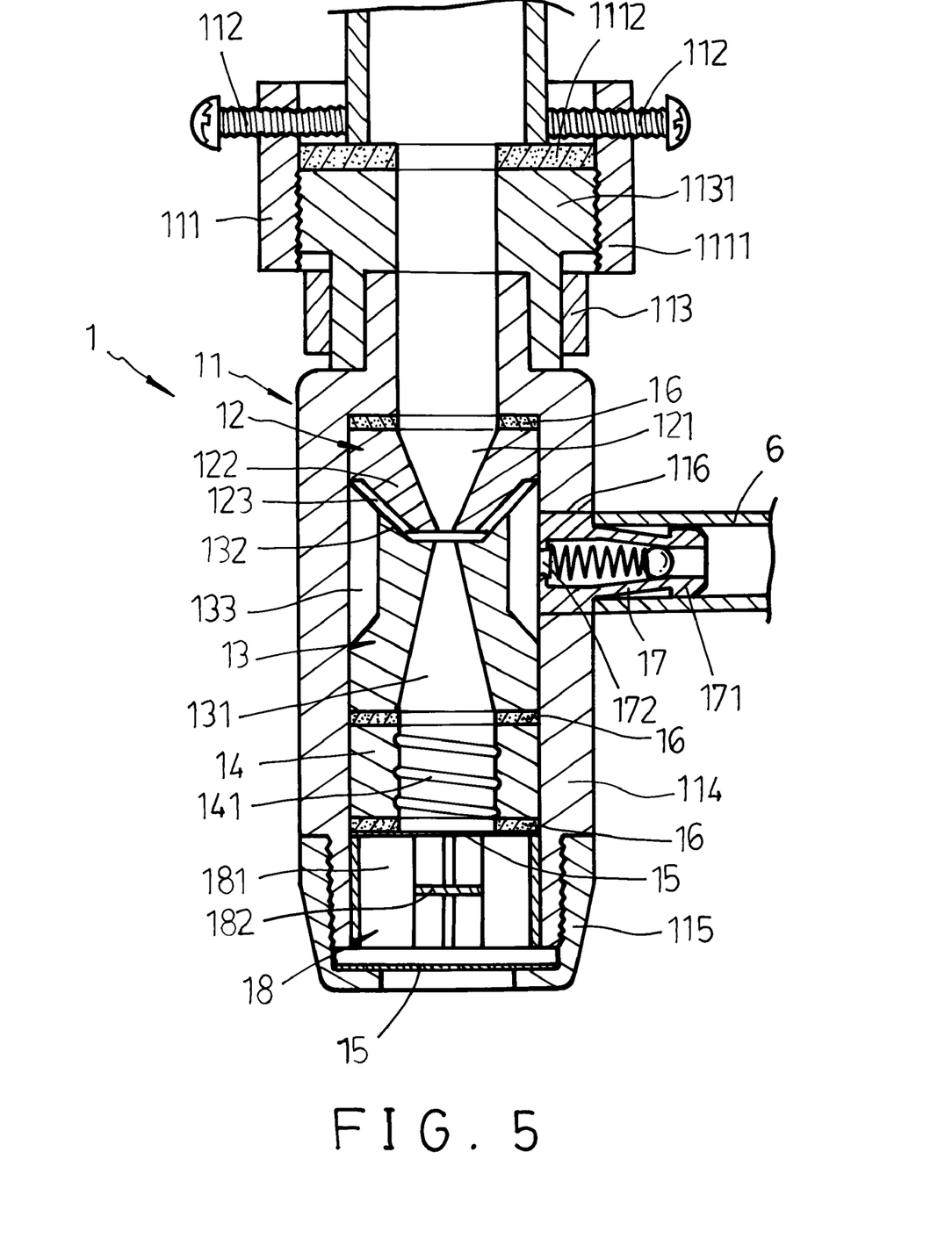
FIG. 5 is a sectional view in an enlarged scale of the ozone/water mixer shown in FIG. 3.

When water passes through the nozzle 12 into the tapered center hole 131 of the nozzle adapter 13, its flowing speed is greatly increased (because the diameter of the tapered center through hole 121 of the nozzle 12 gradually reduces in direction from the mounting socket 111 toward the nozzle adapter 13), there ozone can be dissolved in water efficiently. Further, the ozonizer 2 is controlled by a negative pressure controlled starting switch means. When the water tap 3 is opened, the ozonizer 2 is automatically started to generate ozone.

Figure 6:
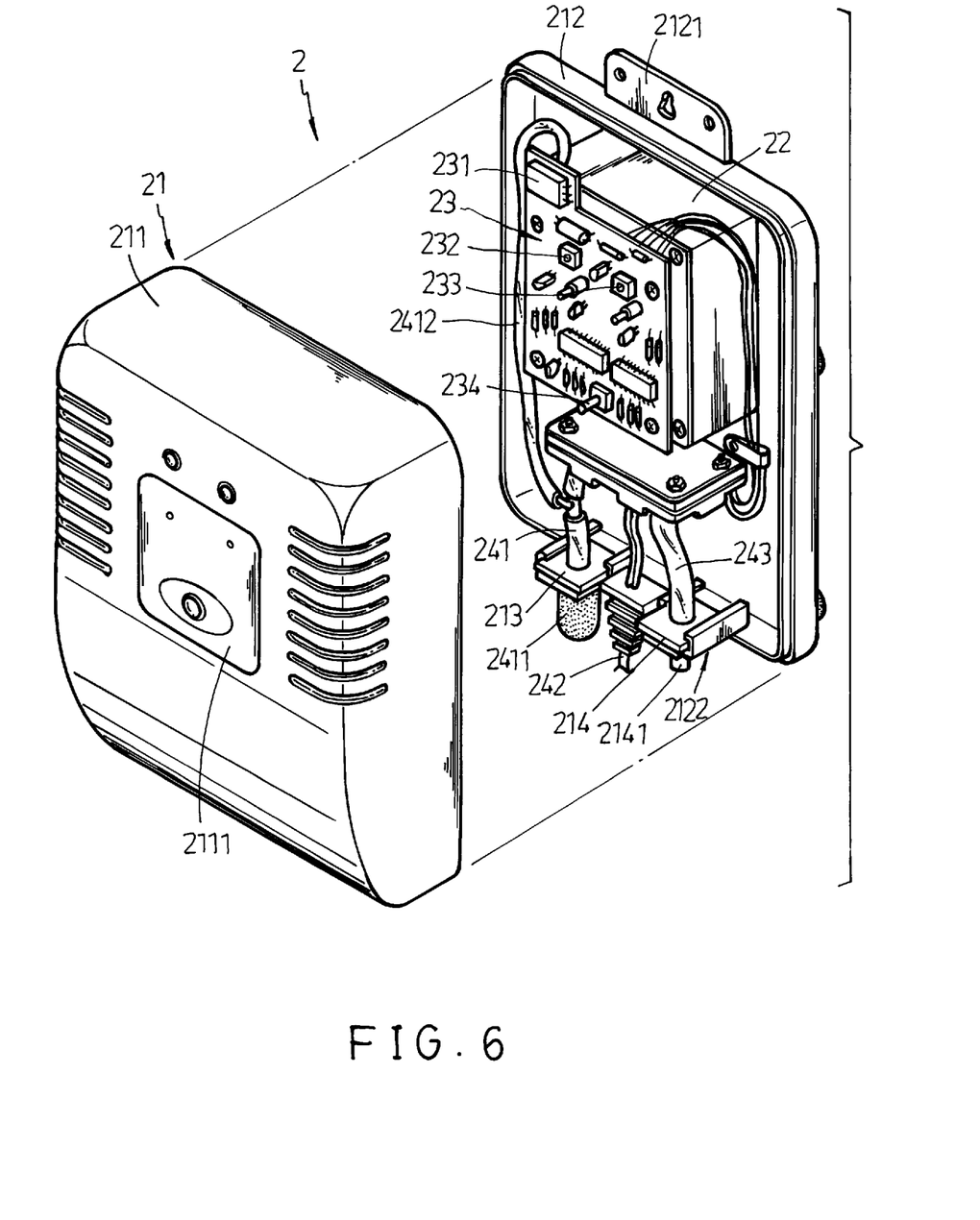
FIG. 6 is an exploded view of an ozonizer for the ozone generating and ozone/water mixing apparatus according to the present invention.
Figure 8:
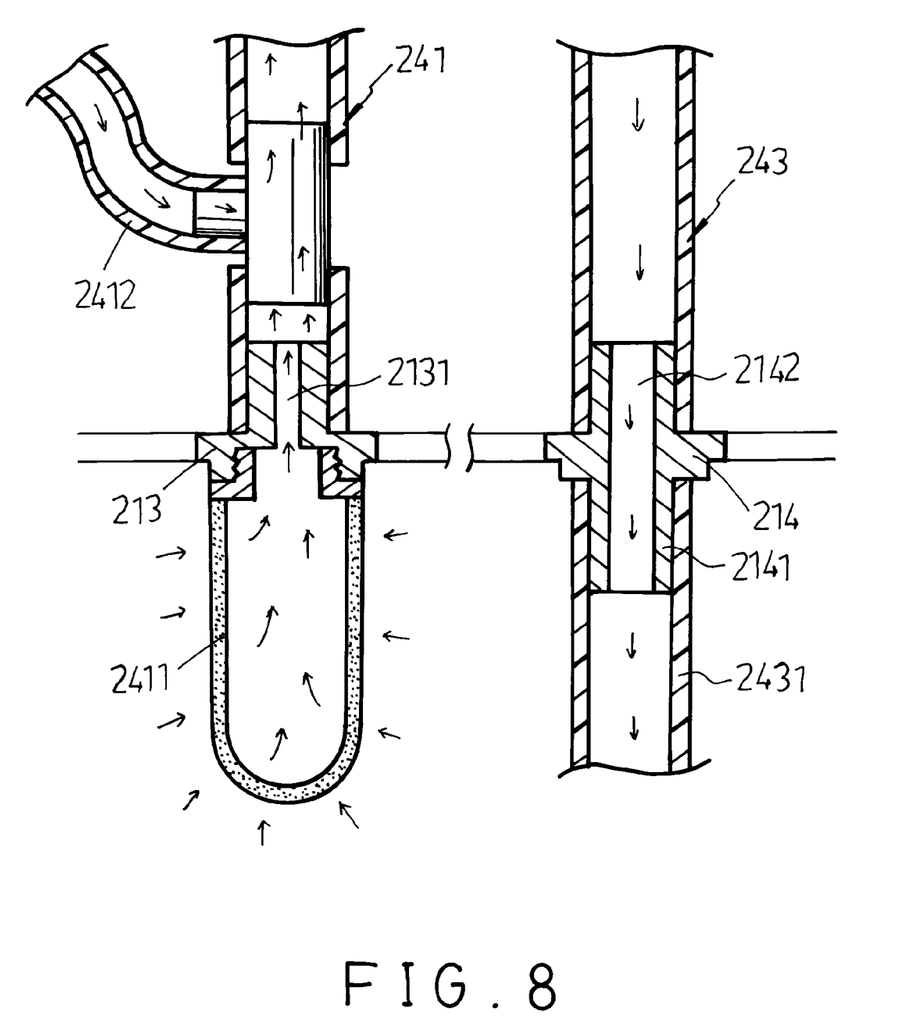
FIG. 8 is a schematic drawing of a part of the ozonizer according to the present invention, showing the flowing direction of input currents of air and the flowing direction of output currents of ozone contained water.

Referring to FIGS. 6 and 8 and FIG. 1 again, the ozonizer 2 comprises a housing 21, a transformer 22, a circuit board 23, and an ozone generating unit 24. The housing 21 is comprised of a top cover shell 211, and a bottom cover shell 212. The top cover shell 211 comprises a control panel 2111 at its front side. The bottom cover shell 212 comprises a hanging plate 2121 raised from the top side thereof for hanging, and a bottom rack 2122 at the bottom side thereof. The transformer 22, the circuit board 23 and the ozone generating unit 24 are fixedly mounted inside the bottom cover shell 22. The circuit board 23 comprises a negative pressure inductor 231 driven by a negative pressure to control the operation of the ozone generating unit 24, a negative pressure sensitivity adjustment means 232 for adjusting the sensitivity of the negative pressure inductor 231, an ozone output volume adjustment means 233 for adjusting the output volume of the ozone generating unit 24, and a power switch 234. The ozone generating unit 24 is connected to the transformer 22 and the circuit board 23 by conductors, having an air input end connected to an air inlet tube 241, which is installed in a hole 2131 on a locating plate 213 at the bottom rack 2122 and mounted with an air filter 2411, and an ozone output end connected to an ozone outlet tube 243, which is installed in a hole 2142 on a locating plate 214 at the bottom rack 2122 and connected to the guide tube 6 through a connecting portion 2141 of the locating plate 214. Further, a power cord 242 is provided having one end connected to the ozone generating unit 24 and an opposite end mounted with an AC to DC converter 25, which is designed to convert AC 110~220V to DC 12V.

Figure 7:
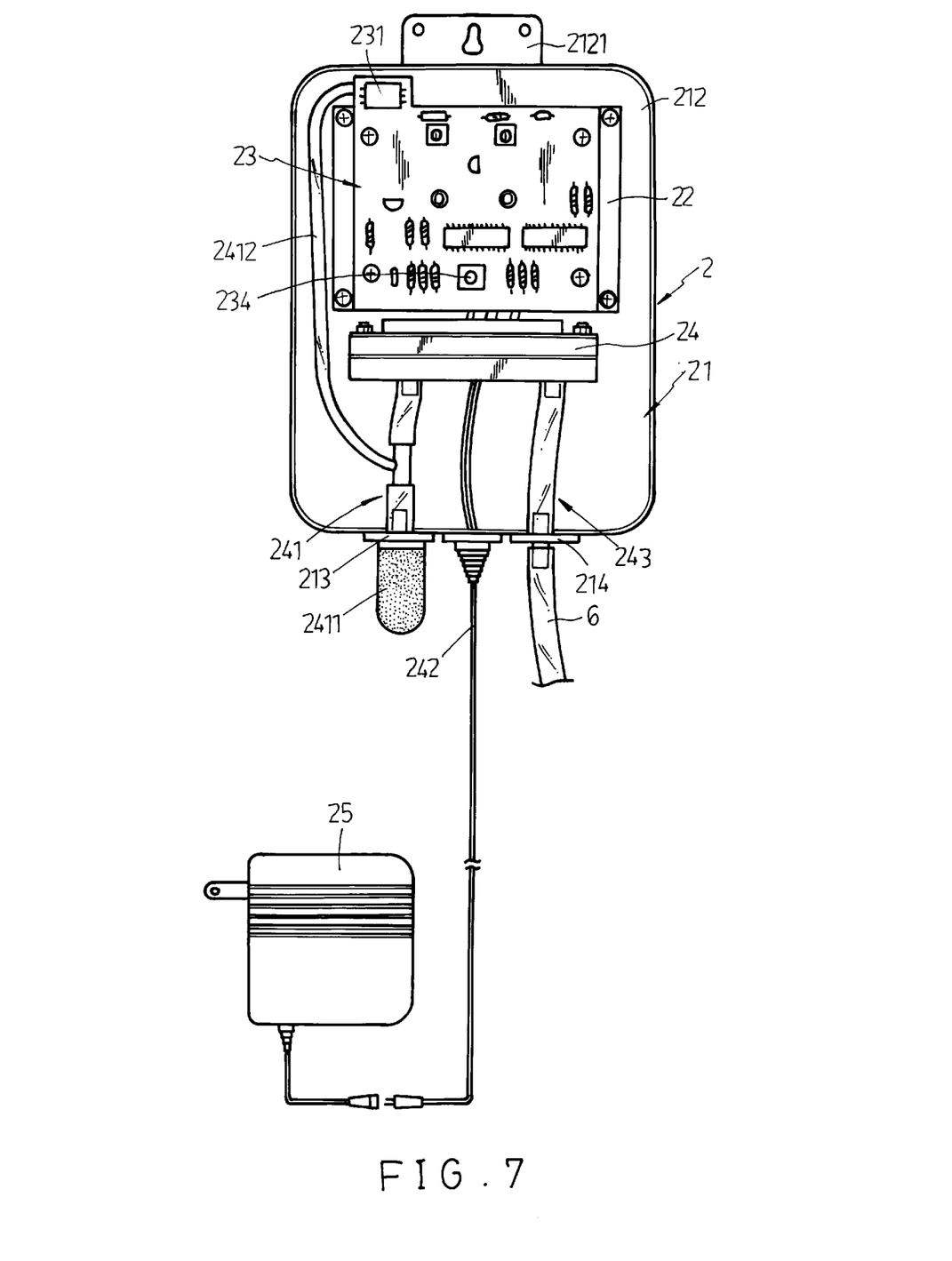
FIG. 7 is a plain view of the ozonizer for the ozone generating and ozone/water mixing apparatus according to the present invention.

Referring to FIGS. 7 and FIGS. 1 and 8 again, the ozone outlet tube 243 is connected to the one-way valve 17 at the ozone/water mixer 1 through the connector 2141 and the guide tube 6. When the water tap 3 is opened, the negative pressure inductor 231 is induced to switch on the power switch 234, causing the ozonizer 2 to be started. Because the diameter of the hole 2131 is smaller than the diameter of the hole 2142, a pressure difference exists between the inlet tube 241 and the outlet tube 243 when the water tap 3 is opened, thereby causing a negative pressure to be produced at a branch tube 2412, which is connected between the inlet tube 241 and the negative pressure inductor 231 at the circuit board 23. When a negative pressure is produced at the branch tube 2412, the negative pressure inductor 231 is induced to switch on the power switch 234. When the ozonizer 2 is started, outside fresh air passes through the air filter 2411 and the hole 2131 on the locating plate 213 into the ozone generating unit 24 via the inlet tube 241. When a current of air passes through the ozone generating unit, a silent electric discharge passes through the current of air, causing oxygen in the current of air to be converted into ozone (because this process is of the known art and not within the scope of the present invention, the related detailed structure is not illustrated in the drawings). Generated ozone is then driven out of the outlet tube 243 into the ozone/water mixer 1 through the guide tube 6.

Figure 9:
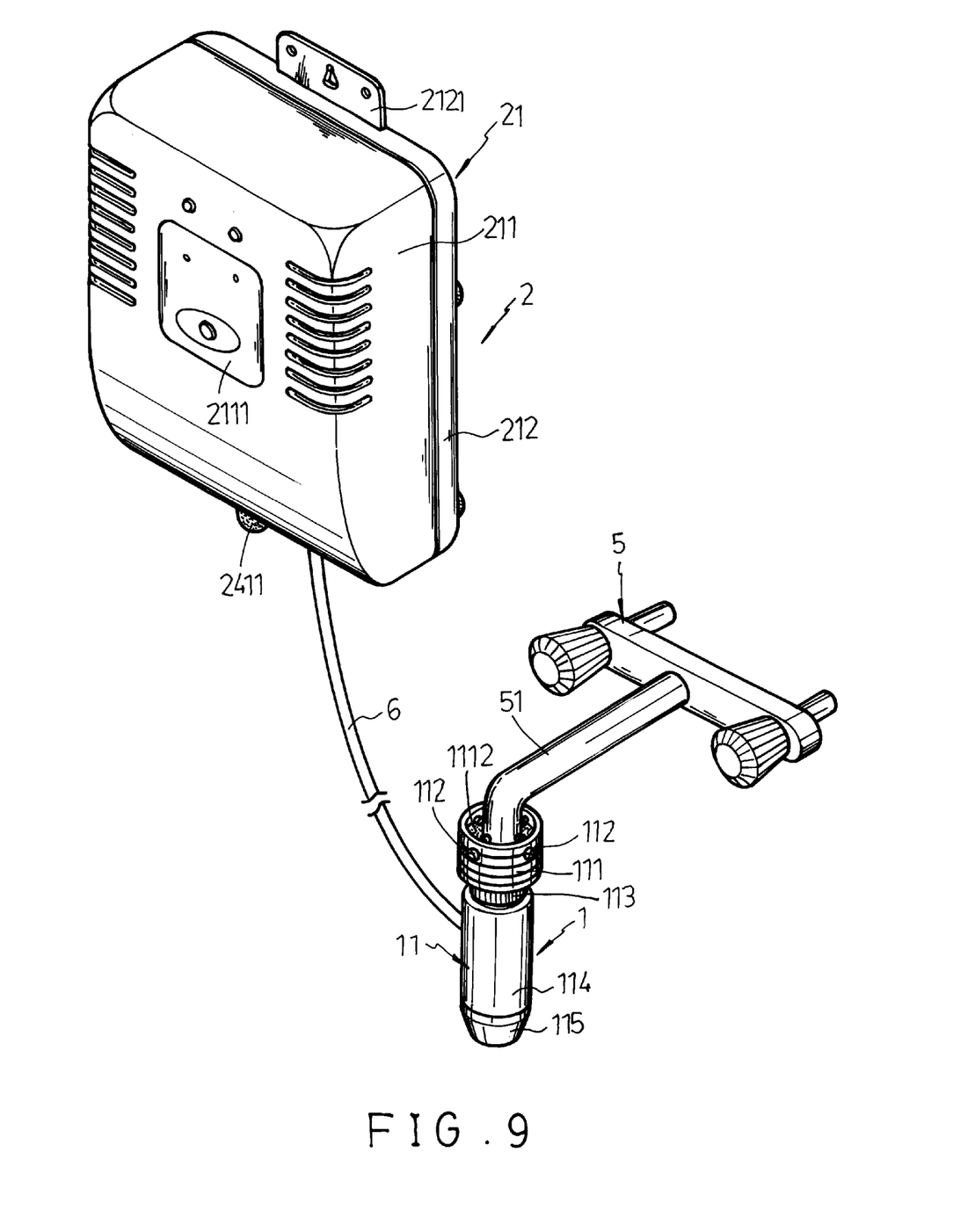
FIG. 9 shows another application example of the present invention.

Referring to FIG. 9, the mounting socket 111 of the ozone/water mixer 1 can be connected to the spout assembly 51 of a kitchen faucet 5, so that ozone contained water can be provided for washing fruits, vegetables, the hands, etc.

What the invention claimed is:

1. An ozone generating and ozone/water mixing apparatus comprising:

an ozonizer for converting oxygen into ozone, said ozonizer comprising a housing, a control circuit board mounted inside said housing, a power supply circuit means which provides the necessary working power supply to said circuit board, a power switch controlled to transmit power supply from said power supply circuit means to said control circuit board, a negative pressure inductor driven by a negative pressure to switch on said power switch, and an ozone generating unit controlled by said control circuit board to convert oxygen into ozone, said ozone generating unit having a air inlet tube for guiding in outside fresh air and an ozone outlet tube for output of generated ozone, said housing comprising a bottom cover shell and a top cover shell covered on said bottom cover shell, said bottom cover shell comprising a bottom rack, a first locating plate mounted on said bottom rack and defining an air inlet for guiding outside fresh air to the air inlet tube of said ozone generating unit, and a second locating plate mounted on said bottom rack and defining an ozone outlet for guiding generated ozone out of the ozone outlet tube of said ozone generating unit, the diameter of said air inlet being smaller than said ozone outlet, said negative pressure inductor being connected to said air inlet tube by a branch tube and induced by a negative pressure produced in said branch tube when generated ozone is continuously guided out of said ozone outlet tube; and an ozone/water mixer for receiving ozone from said ozonizer and mixing received ozone with water, said ozone/water mixer comprising a body, said body having an ozone inlet connected to the ozone outlet at said second locating plate to receive ozone from said ozonizer, a water inlet connected to a water tap to receive water from said water inlet, enabling intake water to be mixed with intake ozone in said body, and a water outlet for guiding ozone/water mixture out of said body, a nozzle adapter mounted inside said body, and a nozzle supported on said nozzle adapter to guide water from said water tap and ozone from said ozone inlet into said nozzle adapter for mixing, said nozzle comprising a conical nozzle body, a tapered center through hole disposed in communication with said water tap for receiving water from said water tap to said nozzle adapter, and a plurality of radial ozone guide grooves equiangularly spaced around said nozzle body for guiding ozone from said ozone inlet into said nozzle adapter, said nozzle adapter comprising a tapered top open chamber which receives the conical nozzle body of said nozzle, a tapered center hole axially downwardly extended from said tapered top open chamber to the water outlet of said body, the diameter of the tapered center hole of said nozzle adapter gradually downwardly increasing in direction from said tapered top open chamber toward the water outlet of said body.

2. The ozone generating and ozone/water mixing apparatus of claim 1 wherein said ozone/water mixer further comprises a flow guide barrel mounted inside said body to guide ozone/water mixture from said nozzle adapter to the water outlet of said body, and a water outlet fitting mounted inside said body to guide ozone/water mixture from said flow guide barrel to the water outlet of said body, said flow guide barrel comprising a spiral guide groove around an inside wall therefore for guiding ozone/water mixture into a spiral flow rotatably flowing toward the water outlet of said body through said water outlet fitting, said water outlet fitting comprising a plurality of axial baffles equiangularly spaced around an inside wall thereof, said axial baffles defining a plurality of axially extended diffusion troughs for guiding ozone/water mixture from said flow guide barrel to the water outlet of said body.

3. The ozone generating and ozone/water mixing apparatus of claim 2 wherein said ozone/water mixer further comprises a wire gauze filter mounted inside said body and retained between said flow guide barrel and said water outlet fitting.

* * * * *